United States Patent Office 3,541,140
Patented Nov. 17, 1970

3,541,140
PROCESS FOR PREPARING DETERGENT SULFONATES
Clarence R. Murphy, Allison Park, and Warren K. Porter, Jr., Gibsonia, Pa., assignors to Gulf Research & Development Company, Pittsburgh, Pa., a corporation of Delaware
No Drawing. Filed Dec. 17, 1968, Ser. No. 784,484
Int. Cl. C07c 143/02, 143/20
U.S. Cl. 260—513                            12 Claims

ABSTRACT OF THE DISCLOSURE

A process for separating sulfonates obtained from the reaction of an olefinic compound with an alkali bisulfite in a lower water-soluble alcohol and water in the presence of a free radical initiator which involves maintaining a critical ratio of water to said alcohol in the reaction product and separating the resulting aqueous phase from the organic phase at an elevated critical temperature.

---

An olefinic compound, such as dodecene-1, can be reacted with an alkali bisulfite, such as sodium bisulfite, in an alcohol solvent, such as isopropanol and water in the presence of a free-radical initiator, such as azobisisobutyronitrile, to obtain a sulfonate addition product thereof, such as a sodium alkane sulfonate, which possesses excellent detergency properties. The reaction mixture contains organic compounds, water and water-soluble salts. The recovery of the addition product from the reaction product substantially free of contaminating materials is exceedingly difficult. We have found that a substantially pure addition product can be obtained by the mere expedient of maintaining a critical ratio of said alcohol to water in the reaction product and effecting the separation of the aqueous phase from the organic phase at an elevated critical temperature.

As noted, the desired detergent product obtained herein results from the reaction of an olefinic compound with an alkali bisulfite. The mono olefinic hydrocarbon compound employed can be a straight or branched chain, internal or terminal, olefinic compound having from five to 20 carbon atoms, preferably from 10 to 18 carbon atoms, such as pentene-1, hexene-1, heptene-1, octene-1, decene-1, dodecene-1, tetradecene-1, eicosen-1, pentene-2, hexene-2, hexene-3, heptene-2, heptene-3, octene-2, octene-3, octene-4, eicosene-2, eicosene-4, eicosene-5, eicosene-8, eicosene-10, polymers of prepolyene, butylene or isobutylene; cyclohexene, methylcyclohexene, propylcyclohexene, etc. Of these we prefer to employ straight chain terminal olefins. Any alkali bisulfite can be employed in the reaction with the olefinic compound defined above. By "alkali" in this context we intend the same to refer to an alkali metal, alkaline earth metal, amine, ammonium, etc. Examples of such alkali bisulfites are alkali metal bisulfites, such as sodium, potassium, rubidium, cesium and lithium bisulfites; alkaline earth metal bisulfites such as calcium, strontium and magnesium bisulfites; ammonium bisulfite and amine bisulfites, such as triethanolamine bisulfite, etc. Of these, the alkali metal bisulfites, especially sodium bisulfite, and ammonium bisulfite are preferred. The molar ratio of the alkali bisulfite to olefinic compound can be varied over a wide range, for example, from about 10:1 to about 1:10, although a molar range of about 1.1:1 to about 2:1 is preferred. The reaction must be carried out in a pH range of about 4 to about 9, preferably in the range of about 6 to about 8, because above a pH of about 9 the desired bisulfite ion is largely neutralized to sulfite which is nonreactive, while below a pH of about 4 the bisulfite is converted to sulfurous acid which can decompose to $SO_2$ and water. Within the defined pH range less difunctional sulfur compounds are formed. In order to control the pH at the desired level a basic reagent is added to the reaction mixture. An alkaline compound, such as sodium sulfite, is preferred for this purpose, although any compound can be used which under the conditions of the reaction reacts with the alkali bisulfite to form the corresponding alkaline sulfite. Examples of such basic reagents which can be used include basic metal oxides, basic metal hydroxides, basic nitrogen compounds, etc. such as sodium oxide, potassium oxide, magnesium oxide, sodium hydroxide, potassium hydroxide, magnesium hydroxide, ammonia, trimethyl amine, etc. The amount of basic reagent employed need be just the amount required to obtain and maintain the desired pH, for example, the molar amounts thereof relative to the alkali bisulfite being in the range of about 1:1 to about 1:20, preferably about 1:4 to about 1:15.

The desired reaction is carried out in the presence of a lower water-soluble alkanol having from one to four carbon atoms, such as methanol, ethanol, normal propanol, isopropanol and tertiary butanol, especially isopropanol, as a solvent for the organic components in the reaction system, and water as a solvent for the salts and other water-soluble components in the reaction system. The amounts of such solvents that need be present are those amounts sufficient to solubilize the contents of the reaction system. Thus, the weight ratio of alcohol solvent to olefinic compound can be from about 2:1 to about 4:1, preferably from about 1.5:1 to about 3.5:1, and the weight ratio of water to olefinic compound can be from about 1:1 to about 5:1, preferably from about 1.5:1 to about 3:1.

The reaction between the olefinic compound and the alkali bisulfite must be carried out in the presence of a free radical initiator. Any free radical initiator known for such reaction can be employed. Thus, oxygen; nitrogen-containing initiators, such as azobisisobutyronitrile, azobisdimethylvaleronitrile, azobismethylpropionitrile, etc.; aliphatic and aromatic peresters in which the peroxy group is attached to at least one tertiary carbon atom such as t-butyl perbenzoate, t-butyl pertoluate, di-t-butyl-perphthalate, t-butyl peroxyisobutyrate, t-butyl peroxypivalate, t-butyl peracetate, etc.; inorganic peroxides, such as hydrogen peroxide, sodium peroxide, barium peroxide, oxides, such as benzoyl peroxide, methylethylketone peroxide, acetyl peroxide, ditertiary butyl peroxide, lauroyl peroxide, etc.; organic hydroperoxides such as tertiary butyl hydroperoxide, dimethyl-bis(hydroperoxy)-hexane, cumene hydroperoxide, etc.; inorganic oxygen-containing salts, such as sodium nitrate, sodium nitrite, etc. The amount of free-radical initiator can be, for example, from about 0.25 to about 10, preferably from about one to about five percent, by weight based on the olefinic compound.

The reaction conditions can be maintained over a wide range. Thus, the temperature can be from about 70° to about 200° F., preferably from about 150° to about 170° F., the pressure from about atmospheric to about 1000 pounds per square inch gauge, preferably from about atmospheric to about 20 pounds per square inch gauge, and the reaction time about 30 minutes to about 15 hours, preferably about six to about twelve hours.

At the end of the reaction period the reaction product will contain from about two to about 50 percent, preferably from about five to about 10 percent of the unreacted olefinic compound and/or alkali bisulfite, substantially all of the basic reagent, as such, or as the corresponding sulfate, used to control the pH, alcohol solvent, water and the desired sulfonate. The free radical initiator is presumably not present, since it is believed to be destroyed in the reaction. The desired sulfonate addition product is believed to be a mixture of three types of compounds resulting from the addition of the alkali bisulfite to the olefin. Thus, when sodium bisulfite is used, the mixture is believed to result in the formation of the three types of compounds, a sodium alkane sulfonate, a sodium alkane sulfonate-sulfinate and a sodium alkane disulfonate. Based on the total sulfonate compounds, the sodium alkane sulfonate is believed to be present in an amount of about 10 to about 70 percent by weight, the sodium alkane sulfonate-sulfinate about 0 to about 40 percent by weight and the sodium alkane disulfonate about five to about 75 percent by weight. Some unreacted olefinic compound present will be found as an upper layer and can be removed from the product in any convenient manner, for example, by decantation.

In the event oxygen has been used as a free radical initiator the basic reagent employed to control the pH will not be found as such in the reaction product but will have been converted to a water-soluble sulfate corresponding to the alkali bisulfite used. If a free radical initiator other than oxygen has been used the basic reagent will be present in its original form in the reaction product. To convert the basic reagent in the reaction product to the neutral sulfate corresponding to the alkali bisulfite used, molecular oxygen in an amount at least sufficient to oxidize sulfites and bisulfites present to the corresponding sulfates can be passed through the reaction product at a temperature of about 70° to about 150° F., preferably a temperature of about 100° to about 140° F., over a period of about one to about ten hours, preferably about four hours. Thereupon the reaction mixture is made neutral to convert the sulfates and bisulfates present to neutral sulfates, for example, by treating the mixture with at least the stoichiometric amount of an alkaline agent, such as sodium hydroxide.

The recovery of substantially pure sulfonate addition product from the reaction product is exceedingly difficult. Since the reaction product would be expected to have a tendency to resolve itself into two phases, an upper organic phase carrying the organic components and a lower aqueous phase having dissolved therein the inorganic salts and other water-soluble materials, it would be expected that a simple separation of the two phases could easily be executed, for example, by decantation. We have found, however, that such resolution is not easily defined and that separation or association of the components of the reaction product into the respective solvent phases is not easily obtained. We have found, however, that a clear resolution of two separate and distinct phases, an upper organic phase and a lower aqueous phase, with the components of the reaction product being in each of the proper phases, can be obtained by maintaining during the separation a concentration of alcohol to water in a weight ratio of about 55:45 to about 65:35, preferably about 60:40 and the temperature of the reaction product of at least about 125° and no higher than about 170° F., preferably within the range of about 130° to about 140° F. Since the amount of water and alcohol in the reaction product may not be within the desired critical range, an alcohol, identical to the alcohol solvent used during the bisulfite addition to the olefinic compound, and/or water, in any order, are added to the reaction product. During the separation of the two phases, the temperature, as noted, must be maintained within the defined critical range. Merely to raise the temperature into the critical temperature range, even with the proper alcohol-water ratio, and then attempt to effect the separation outside the critical temperature range will not suffice to obtain the clear separation and the desired solubility of products in the respective solvents.

As pointed out above, the water-alcohol ratio and the temperature of the reaction product during the separation are critical. Below the defined temperature range two distinct phases are not easily obtained and some of the sulfonate addition product and some of the inorganic salts present will have a tendency to precipitate out of solution and a slurry will result. Even if filtration of the resulting mixture is effected, a mixture of salt and sulfonate addition product will be obtained which are almost impossible to separate from each other. If water in excess of the critical amounts is present, even in the desired temperature range, the two phases will not have a tendency to separate into two separate and distinct layers. If alcohol in excess of critical amounts is present, even in the desired temperature range, some of the sulfonate addition product will precipitate out of solution. We have found that such sulfonate addition products are difficult to remove by conventional filtration techniques.

When the reaction product contains the critical alcohol-water ratios and when it is maintained in the critical temperature range, a clear and distinct separation of the upper organic phase and a lower aqueous phase is obtained. The separation of the two phases from each other is easily obtained in any convenient manner, for example, by decantation. The lower aqueous phase will contain substantially all of the inorganic salts, for example, sodium sulfate is present when sodium bisulfite is used in the addition reaction, and sodium sulfite is used to maintain desired pH values. The upper or organic phase will contain the alcohol and the desired sulfonate addition product. The addition product can be recovered from the organic phase, for example, by evaporation or vacuum drying. The sulfonate addition product so recovered will be substantially free of salts, for example, less than about five percent by weight, but in most cases less than three percent by weight. Such amounts can be tolerated in a detergent. Above such amounts the salts interfere with the physical properties of the detergent, increase the viscosity of solutions thereof, facilitate precipitation of the detergent from solutions and have a tendency to appear as a chalky surface on detergent bars.

The process of this invention can further be illustrated by the following. Into a stirred autoclave there was added 25.15 pounds of sodium metabisulfite, 2.22 pounds of sodium sulfite, 32.47 pounds of tetradecene-1, 104.37 pounds of isopropanol, 44.09 pounds of distilled water and 0.61 pound of azobisisobutyronitrile. The mixture was heated with stirring for 11.75 hours at a temperature of 165° F. and atomspheric pressure. At the end of this period unreacted olefin was removed from the reaction product by diluting with 110.35 pounds of water and extracted with 73 pounds of hexane. The resulting product was air blown for four hours at 130° F. to convert the sodium sulfite to sodium sulfate. The mixture was neutralized with six pounds of 40 percent aqueous sodium hydroxide. Desalting was effected by adding 240.32 pounds of isopropanol to the mixture. The weight ratio of isopropanol to water in the mixture was about 66:44 percent. This resulted in the formation of two liquid phases, an upper clear solution containing the desired sodium alkane sulfonate resulting from the addition of the sodium metabisulfite to the alpha olefin, and a lower clear aqueous phase containing sodium sulfate and water. Separation of the two phases was effected by decantation. During the desalting operation the temperature was maintained at 130° F. The sodium alkane sulfonate was found to contain about 1.5 percent by weight of sodium sulfate, which is well within the specifications ordinarily required for sodium alkane sulfonates. We have found by experimentation that when the temperature during the separation procedure was maintained below about 125° F., the two phases were cloudy and, at best, only a partial separation could be effected and that the sodium alkane sulfonate phase contained excess amounts of sodium sulfate and the aqueous phase contained excessive amounts of sodium alkane sulfonate. The further purification of the two phases so obtained are difficult and, in some cases, almost impossible to effect. We have also found that when we attempt to effect desalting with alcohol-water ratios outside the defined limits, the process becomes inoperative. If water is present in excess of the defined limits, no separation of the two phases is found. On the other hand, if alcohol is present outside the defined limits, precipitation of the sodium alkane sulfonates results in the salt phase. Recovery of the sodium alkane sulfonate by filtration is not feasible because of the gelatinous or pasty nature thereof.

Obviously, many modifications and variations of the invention, as hereinabove set forth, can be made without departing from the spirit and scope thereof, and therefore only such limitations should be imposed as are indicated in the appended claims.

We claim:

1. In a process wherein an alkali bisulfite is added to a monoolefinic hydrocarbon having from five to 20 carbon atoms to obtain a sulfonate addition product in a lower water-soluble alkanol having from one to four carbon atoms and water in the presence of a free radical initiator and a basic reagent in a pH range of about 4 to about 9, and the reaction product is resolved into an upper organic phase containing said addition product and a lower aqueous phase, the improvement which comprises maintaining a weight ratio of said alcohol to water in said reaction product within a range of about 55:45 to about 65:35 and a temperature within a range of about 125° to about 170° F. and while the reaction product is within said temperature range effecting separation of the two phases from each other and recovery of said organic phase containing said sulfonate addition product.

2. The process of claim 1 wherein the alkali bisulfite is sodium bisulfite.

3. The process of claim 1 wherein the olefinic compound is a straight chain terminal olefin having from 10 to 18 carbon atoms.

4. The process of claim 1 wherein the alcohol is isopropanol.

5. The process of claim 1 wherein the reaction product is first subjected to contact with oxygen to convert the basic reagent to a sulfate corresponding to said alkali bisulfite.

6. The process of claim 1 wherein the basic reagent is sodium sulfite and the reaction product is first subjected to contact with oxygen to convert the sodium sulfite to sodium sulfate.

7. The process of claim 1 wherein the weight ratio of alcohol to water is about 60:40.

8. The process of claim 1 wherein said temperature range is about 130° to about 140° F.

9. The process of claim 1 wherein the alkali bisulfite is sodium bisulfite, the olefinic compound is a straight chain terminal olefin having from five to 20 carbon atoms, the basic reagent is sodium sulfite, the alcohol is isopropanol and the reaction product is first subjected to contact with oxygen to convert the sodium sulfite to sodium sulfate.

10. The process of claim 1 wherein the alkali bisulfite is sodium bisulfite, the olefinic compound is a straight chain terminal olefin having from five to 20 carbon atoms, the basic reagent is sodium sulfite, the alcohol is isopropanol, the free radical initiator is azobisisobutyronitrile, and the reaction product is first subjected to contact with oxygen to convert the sodium sulfite to sodium sulfate.

11. The process of claim 1 wherein the alkali bisulfite is sodium bisulfite, the olefinic compound is a straight chain terminal olefin having from five to 20 carbon atoms, the basic reagent is sodium sulfite, the alcohol is isopropanol, the reaction product is first subjected to contact with oxygen to convert the sodium sulfite to sodium sulfate, wherein the weight ratio of alcohol to water is about 60:40 and said temperature range is about 130° to about 140° F.

12. The process of claim 1 wherein the alkali bisulfite is sodium bisulfite, the olefinic compound is a straight chain terminal olefin having from five to 20 carbon atoms, the basic reagent is sodium sulfite, the alcohol is isopropanol, the free radical intiator is azobisisobutyronitrile, the reaction product is first subjected to contact with oxygen to convert the sodium sulfite to sodium sulfate, wherein the weight ratio of alcohol to water is about 60:40 and said temperature range is about 130° to about 140° F.

References Cited

UNITED STATES PATENTS 3,306,931    2/1967    Adams et al.

DANIEL D. HORWITZ, Primary Examiner

U.S. Cl. X.R.

260—503

PO-1050
(5/69)

UNITED STATES PATENT OFFICE
CERTIFICATE OF CORRECTION

Patent No. 3,541,140     Dated November 17, 1970

Inventor(s) Clarence R. Murphy and Warren K. Porter, Jr.

It is certified that error appears in the above-identified patent and that said Letters Patent are hereby corrected as shown below:

Column 1, line 50, "polymers of prepolyene" should read "polymers of propylene".

Column 2, line 47, after "barium peroxide," insert "lithium peroxide, potassium peroxide, etc.;".

Column 2, line 48, cancel "oxides" and insert in lieu thereof "organic peroxides".

SIGNED AND
SEALED
FEB 9 1971

(SEAL)
Attest:

Edward M. Fletcher, Jr.
Attesting Officer

WILLIAM E. SCHUYLER, J
Commissioner of Patent